(12) United States Patent
Kern (10) Patent No.: US 8,782,554 B2
(45) Date of Patent: Jul. 15, 2014

(54) CONTEXT MENU DEPENDENCY ON MANY OBJECTS OF DIFFERENT TYPE

(75) Inventor: Thomas Kern, Wiesloch (DE)

(73) Assignee: SAP AG, Walldorf (DE)

( * ) Notice: Subject to any disclaimer, the term of this patent is extended or adjusted under 35 U.S.C. 154(b) by 1284 days.

(21) Appl. No.: 11/351,397

(22) Filed: Feb. 10, 2006

(65) Prior Publication Data

US 2006/0184898 A1 Aug. 17, 2006

(30) Foreign Application Priority Data

Feb. 11, 2005 (EP) ..................................... 05100979

(51) Int. Cl.
*G06F 3/048* (2013.01)
*G06F 17/30* (2006.01)
*G06F 3/0484* (2013.01)
*G06F 3/0481* (2013.01)
*G06F 3/0483* (2013.01)
*G06F 3/0482* (2013.01)

(52) U.S. Cl.
CPC ...... *G06F 17/30126* (2013.01); *G06F 3/04842* (2013.01); *G06F 3/0481* (2013.01); *G06F 3/0483* (2013.01); *G06F 3/0482* (2013.01); *Y10S 715/975* (2013.01); *G06F 3/0484* (2013.01); *G06F 3/048* (2013.01); *G06F 3/04817* (2013.01)
USPC ........... 715/810; 715/808; 715/809; 715/817; 715/825; 715/826; 715/975

(58) Field of Classification Search
CPC . G06F 17/30126; G06F 3/048; G06F 3/0482; G06F 3/0481; G06F 3/04817; G06F 3/0484; G06F 3/04842; G06F 3/0483; Y10S 715/975
USPC .......... 715/810, 808, 809, 817, 825, 826, 975
See application file for complete search history.

(56) References Cited

U.S. PATENT DOCUMENTS 4,905,162 A * 2/1990 Hartzband et al. .............. 706/52
5,295,242 A 3/1994 Mashruwala et al.
(Continued)

FOREIGN PATENT DOCUMENTS

EP 0592046 A 4/1994
WO WO-91/02304 A1 2/1991

OTHER PUBLICATIONS

"Search Report for European Application No. 05100979", (Sep. 23, 2005),3 pgs.

*Primary Examiner* — Patrick Riegler
(74) *Attorney, Agent, or Firm* — Schwegman, Lundberg & Woessner, P.A.

(57) ABSTRACT

A computer implemented method is represented for providing to a user a context menu with entries representing relationships. The relationships are applicable to relate objects selected from a set of objects. The method comprises following method operations: receiving a first identification of a first selected object from the set of objects, receiving a second identification of a second selected object from the set of objects, identifying object types of the selected objects in a plurality of object types, determining one or more relationship types of which one or more relationships are applicable to the selected objects by using the identified object types, and generating for the context menu an entry representing a relationship of the one or more relationship types, wherein the relationship is selectable by the user to be created between the selected objects.

19 Claims, 9 Drawing Sheets

(56) References Cited

U.S. PATENT DOCUMENTS

| | | | |
|---|---|---|---|
| 5,524,246 A | 6/1996 | Hurley et al. | |
| 5,664,133 A | 9/1997 | Malamud et al. | |
| 5,796,401 A * | 8/1998 | Winer | 345/619 |
| 5,903,478 A | 5/1999 | Fintel et al. | |
| 5,995,973 A * | 11/1999 | Daudenarde | 707/103 R |
| 6,008,806 A * | 12/1999 | Nakajima et al. | 715/744 |
| 6,370,537 B1 * | 4/2002 | Gilbert et al. | 1/1 |
| 6,401,096 B1 * | 6/2002 | Zellweger | 707/100 |
| 6,493,006 B1 * | 12/2002 | Gourdol et al. | 715/825 |
| 6,640,221 B1 * | 10/2003 | Levine et al. | 707/3 |
| 6,956,574 B1 * | 10/2005 | Cailloux et al. | 345/473 |
| 6,957,229 B1 * | 10/2005 | Dyor | 707/103 X |
| 6,978,269 B1 * | 12/2005 | Johnson et al. | 707/100 |
| 6,983,187 B2 * | 1/2006 | Kern | 700/97 |
| 7,058,902 B2 * | 6/2006 | Iwema et al. | 715/810 |
| 7,158,971 B1 * | 1/2007 | Bascom | 707/10 |
| 7,240,072 B2 * | 7/2007 | McKnight et al. | 707/103 Y |
| 7,272,815 B1 * | 9/2007 | Eldridge et al. | 717/101 |
| 2002/0147740 A1 * | 10/2002 | Faraday et al. | 707/500 |
| 2003/0065488 A1 * | 4/2003 | Beckert et al. | 703/1 |
| 2003/0097369 A1 * | 5/2003 | McKnight et al. | 707/102 |
| 2004/0098151 A1 * | 5/2004 | Carlucci et al. | 700/95 |
| 2004/0122826 A1 * | 6/2004 | Mackie | 707/100 |
| 2004/0177093 A1 * | 9/2004 | Mullins | 707/104.1 |
| 2004/0181542 A1 * | 9/2004 | Mullins | 707/102 |
| 2005/0050471 A1 * | 3/2005 | Hallisey et al. | 715/734 |
| 2005/0108620 A1 * | 5/2005 | Allyn et al. | 715/500 |
| 2006/0149731 A1 * | 7/2006 | Schirmer et al. | 707/6 |
| 2006/0150172 A1 * | 7/2006 | Heath et al. | 717/162 |

* cited by examiner

| relationship type | object type | object type | |
|---|---|---|---|
| RST1 | OT1 | OT2 | 252 |
| RST2 | OT1 | OT1 | 254 |
| RST2 | OT1 | OT3 | 256 |
| RST2 | OT2 | OT3 | 258 |
| ... | | | | table of assignments 250

| relationship type | object type | object type | |
|---|---|---|---|
| RST2 | OT1 | OT2 | 262 |
| RST2 | OT2 | OT2 | 264 |
| RST2 | OT2 | OT2 | 266 |
| RST2 | OT3 | OT3 | 268 |
| ... | | | | table of negative assignments 260

CONTEXT MENU DEPENDENCY ON MANY OBJECTS OF DIFFERENT TYPE

CLAIM OF PRIORITY

The present patent application claims the priority benefit of the filing date of European Application (EPO) No. 05100979.3 filed Feb. 11, 2005, the entire content of which is incorporated herein by reference.

TECHNICAL FIELD

The present disclosure relates generally to the field of electronic data processing and specifically to provision of user interfaces to a user.

DESCRIPTION OF THE RELATED ART

The performance of modern computer systems has reached a high level. Accordingly, the computer systems are able to support complex computer programs. Frequently, the complex computer programs provide also complex user interfaces to a user of the complex computer programs. A complex user interface allows for the exchange of different kinds of information between the computer program and the user. Frequently, the exchanged information is dependent from other information and a dependency may not be obvious to the user.

Typically, the complex user interface provides a graphical user interface that displays many different objects. Furthermore, the complex user interface may provide one or more devices to the user to select an object and to determine a function which is applied to the selected object. One example for such a device is a graphical pointer which is controlled by the user with a handheld pointing device, for example a computer mouse. Displayed objects and applicable functions depend on the computer program. An example is an operating system that allows for a selection of displayed files by the computer mouse and a selection of a function from a menu that is applied to the selected file.

The number of activities that the user can execute with the user interface by combining inputs is typically large. In case an activity requires more than one input it is convenient to support the user by providing additional information to him.

One way to support the user executing an activity is provided by a context menu. Typically, the user selects an object displayed by the user interface and requests the context menu. The context menu may have for example entries of functions that can be applied to the selected object. The user may select one of the listed functions and the selected function is executed for the selected object.

U.S. Pat. No. 5,664,133, discloses a method to support the user by providing the context menu. The user selects a first displayed computer resource and a second displayed computer resource and may request a context menu. The context menu has selectable entries associated with a transfer of the first computer resource to the second computer resource. The selectable entries may be operations that can be executed by the computer program based on the relationship of the first computer resource, that is a file, and the second computer resource, that is a folder.

In computer programs displayed objects may be numerous and the displayed objects have different object types. Furthermore, relationships may also be numerous and the relationships have one or more relationship types. It is convenient to provide a context menu for such computer programs. An example of such a computer program is an operating system displaying a first object which is a file of an object type computer resource and a second object which is a file conversion program of an object type computer program. In the example, a relationship may be of a type file transfer and a further relationship may be of a type application.

DETAILED DESCRIPTION

The following description contains examples and embodiments of the invention that are not limiting the scope of the invention.

An embodiment is a method for providing a context menu with relationships that are of one or more relationship types. A relationship of the context menu is applicable to relate two objects that have been selected previously from a set of objects. The objects of the set of objects have a plurality of object types.

The embodiment may be fast and memory efficient because the relationships in the context menu are generated by identifying object types and determining relationship types. Frequently, in a computer program, a number of object types is smaller than a number of objects and a number of relationship types is smaller than a number of relationships. Accordingly, it may require less data processing to determine the applicable relationships by using types instead of using objects and relationships.

The context menu has only entries with applicable relationships. Relationships that are not applicable to the selected objects are not displayed and are not processed by the computer program. Therefore, the amount of data being processed may be reduced, contributing to a fast and memory efficient execution of a computer program.

The embodiment seeks to prevent errors such as creating a relationship that is not applicable to the selected objects. Such an error may happen when for example a first object is selected, then a relationship applicable to the object is selected and then a second object is selected. In case the second object cannot be related by the selected relationship to the first object the system may try to create an invalid relationship. Even if a following check notices an error it is more efficient to prevent such an error as early as possible. An aspect of error prevention therefore also contributes to the fast execution of the computer program.

The embodiment also contributes to the fast execution of the computer program by providing selectable context menu entries which the user may not be aware of in a current situation. By providing such knowledge, the embodiment may prevent unnecessary activities of the user.

Figure 1:
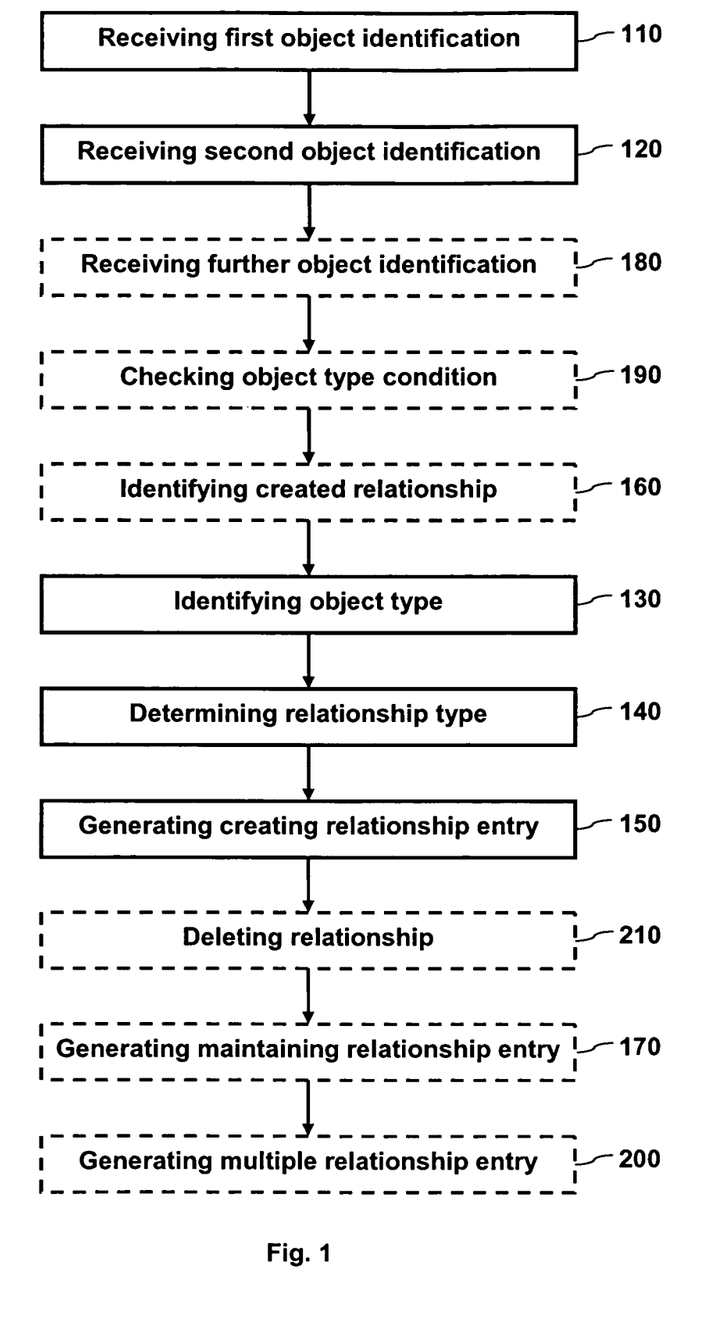
FIG. 1 shows method operations of a method, according to an example embodiment of the invention.

FIG. 1 shows method operations of a method, according to an example embodiment certain method operations of the method are indicated by boxes with dashed lines. The method provides entries for a context menu. The context menu is provided to a user that may select an entry of the context menu. The entries represent certain activities with respect to relationships. The method uses available information about a situation of the user to provide the entries. For example, the entries may represent relationships that can be applied to relate previously selected objects, that is, the relationships are applicable to the selected objects. In this way, the method supports the user in an interaction with a computer program. The objects and the applicable relationships depend on the computer program. An example for the computer program is an operating system that displays files of different types and allows for relating the files.

The computer program may display a set of objects that may be related by applicable relationships. The display of an object may involve the display of an icon representing the object. Frequently, there are dependencies between the objects and between the applicable relationships. According to the dependencies, it may not be possible to use a specific relationship to relate two objects. The user may not be aware of the dependencies and may not know if the specific relationship is applicable to the two objects. In the example, the user may request a context menu with the applicable relationships that may be selected from the context menu and are conforming to the dependencies.

A first method operation is receiving 110 a first identification of a first object which is selected by the user from a set of objects. The set of objects may be defined by objects that are displayed to the user and selectable by the user. The user may use a graphical pointer device to point to the first object and a button for selecting the first object. An example for such a graphical pointer device is a computer mouse. A request of a context menu may be done by using a further button. The selection of an entry from the context menu may be possible by using again the button which is used for selecting the objects. It depends on the computer program if a selection and the request of the context menu can be done by using the graphical pointer device. Frequently, the computer program supports the graphical pointer device. The computer program may also support selecting a displayed object by pressing repeatedly a first button to navigate an object indicator to the first object and by using a second button to select the first object. A user interface may register the selection of the first object and the computer program may provide the first identification to the method. Typically, the first object will be marked so that a selection of the first object is visible.

A following method operation is receiving 120 a second identification of a second object which is selected by the user from the set of objects. The selection of the second object may be done in an analogous way to the selection the first object.

A method operation may include receiving 180 one or more further object identifications from the set of objects. Depending on the computer program it may be feasible to relate two objects by a relationship or more than two objects by a relationship. An example is an operating system which allows for relating a file transformation program with a first file and a second file. Relating the three files may result in transformation of the first file into the format of the second file using the file transformation program. If the computer program allows for relating only two objects it may still be convenient to receive identifications of more than two selected objects because the selected objects can possibly be related by more than one relationship.

A method operation checking 190 an object type condition may be related to providing context menu entries for multiple relationships. Multiple relationships require that a condition is fulfilled that an object of the selected objects is of a first object type and residual objects of the selected objects are of a second object type. The multiple relationships may be created between the object of the first object type and each object of the residual objects by creating one relationship multiple times. Creating multiple relationships gives a same result as creating a single relationship separately between the object of the first object type and the each object of the residual objects. Creating the multiple relationships leads to a fast and efficient execution of the computer program.

A following method operation may include identifying 160 an existing relationship, that is, a relationship that has been created previously between the selected objects. In case that such a relationship is identified and that no further relationship may be created between the selected objects it may be possible to skip some of the following method operations.

A following method operation is identifying 130 object types of the selected objects, wherein the object types are from a plurality of object types. In the example, the file conversion program may have an object type application program. The first file and the second file may have object type computer resource. Other object types may be possible which type the objects from the set of objects.

It follows determining 140 one or more relationship types of which a relationship is applicable to the selected objects. The determining operation involves the identified object types and does not require an identification of a selected object. Accordingly, the determining operation is independent of the number of the objects in the set of objects and the number of available relationships. The determining operation depends on the number of object types of objects of the set and relationship types. It may be possible to define the object types and the relationship types so that the dependencies between the objects and the applicable relationships can directly be described. As an example, it may be possible to define an object type for file conversion programs that require one file and a further object type for file conversion programs that require two files. In the example, selecting a file and the file conversion program requiring two files may not give an entry in the context menu for applying the file conversion program to the file: a relationship type for applying the file conversion program may not be determined because the object type of the file conversion program requires two file object types. In a further example, the object types and the relationship types may be defined by the computer program and may not directly be used to describe the dependencies. In such cases, a following operation may be conveniently executed.

It follows method operation generating 150 an entry for the context menu. The entry represents a relationship of the one or more determined relationship types. The relationship is selectable by the user so that it is created between the selected objects.

Generating operation 150 may include an operation of deleting 210 a relationship. The relationship may be of the one or more relationship types that have been determined but may have an attribute and the attribute may not fulfil a restriction. No entry for the context menu is generated for a deleted relationship. The deleting operation 210 may be useful when object types and relationship types are insufficient to describe the dependencies between the objects and the applicable relationships. In such cases, restrictions applicable to relationship attributes may be used to describe the dependencies in further detail. As an example, it may be possible that a first file conversion program which is applied to one file and a second file conversion program which is applied to two files are of the same relationship type. Accordingly, an apply relationship which applies a file conversion program may be determined even if the second file conversion program and one file have been selected, that is, the apply relationship is not applicable to the selected objects. In such a case the apply relationship may have an attribute specifying the number of the files to which the file conversion program is applied. In the example, the attribute may have the value one because only one file has been selected. A restriction depending on the file conversion program is applied to the attribute of the relationship. The restriction for the second file conversion program may be that two files are to be selected. Accordingly, the restriction is not fulfilled by the apply relationship and the apply relationship is deleted.

It follows an operation generating 170 an entry for the context menu, wherein the entry is selectable to maintain an identified relationship. This method operation requires previously executing the operation identifying 160 a created relationship. Maintaining the relationship may mean deleting the relationship or modifying an attribute of the relationship. The operation generating 170 a maintaining relationship entry may be executed previously to the operation generating 150 the creating relationship entry because the two operations are independent from each other.

It follows operation generating 200 for the context menu an entry representing multiple relationships of the one or more relationship types. This method operation requires previously executing the operation checking 190 the object type condition. The multiple relationships are selectable by the user to be created between the one object of the first object type and the residual objects of the second object type. The operation generating 170 the multiple relationships entry may be executed previously to the operation generating 150 the creating relationship entry and previously to the operation generating 170 a maintaining relationship entry.

FIG. 2 illustrates three successive situations displayed to the user by a user interface, according to an example embodiment. The three situations illustrate a typical sequence of displays that result from an interaction of the user with the computer program.

Figure 2A:
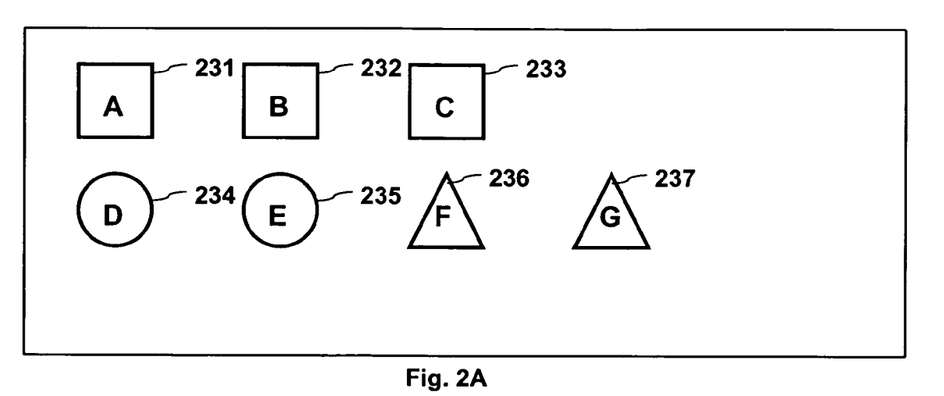
FIG. 2 illustrates three successive situations displayed to a user by a user interface, according to an example embodiment.

FIG. 2A shows an example set of objects 231-237 having three different object types. Objects 231, 232, 233 are of a first object type as indicated by a square shape, objects 234, 235 are of a second object type as indicated by a circle shape, and objects 236, 237 are of a third object type as indicated by a triangle shape. The objects are identified by letters A to G.

Figure 2B:
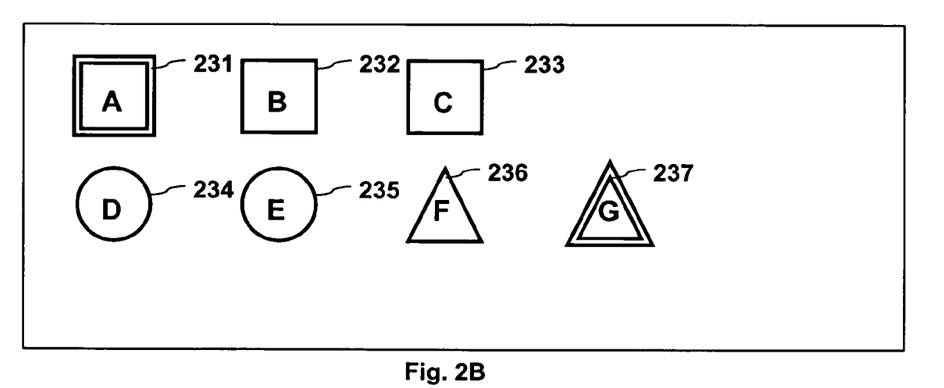

FIG. 2B shows the set of objects 231-237 after the user has selected a first object 231 and a second object 237. The selected objects are visibly marked by double lines.

Figure 2C:
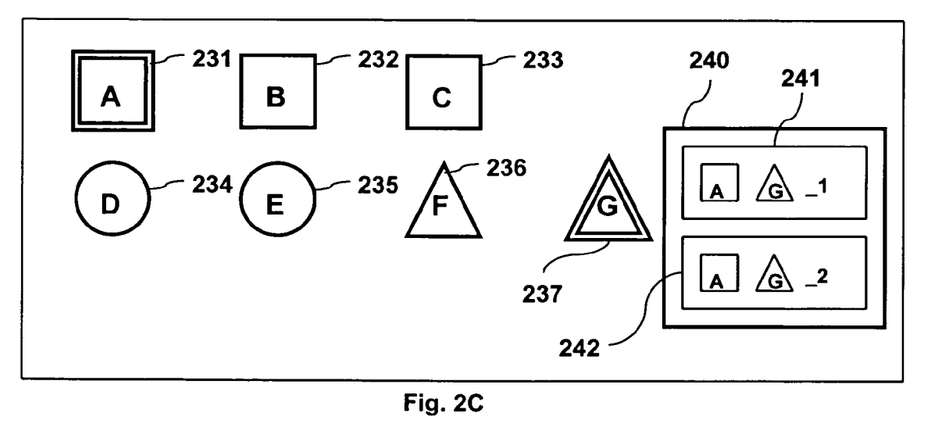

FIG. 2C shows an example display of the user interface after the user has requested the context menu 240. The context menu 240 has two entries 241, 242. The entries 241, 242 represent two different relationships that are applicable to relate the first object 231 and the second object 237. It may be possible that the two relationships are of one relationship type or of two relationship types. Frequently, the user may not be aware of such differences.

Figure 3:
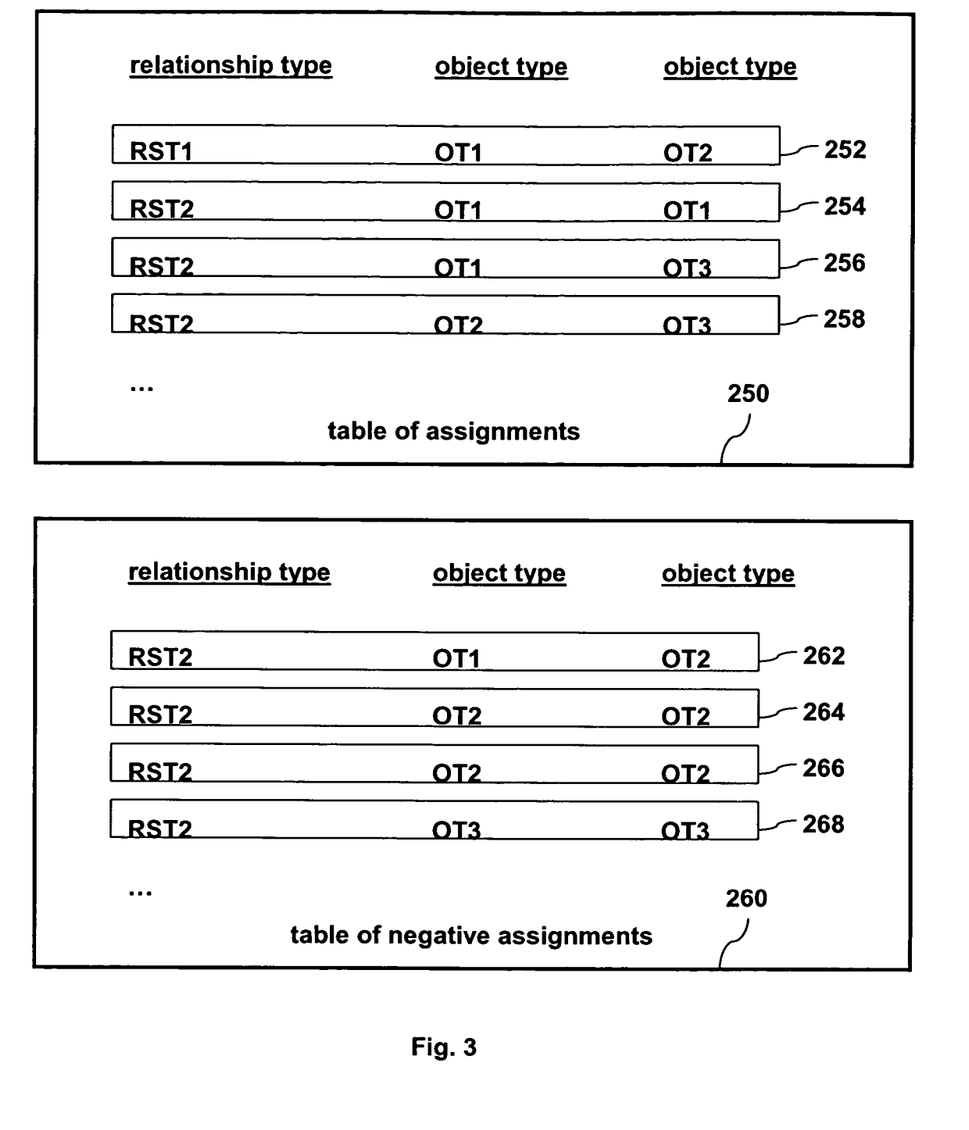
FIG. 3 shows example assignments and negative assignments for determining applicable relationships.

FIG. 3 shows example assignments and negative assignments for determining applicable relationships. A table of assignments 250 contains example assignments 252-258. The assignments 252-258 assign relationship types to a plurality of object types signifying that a relationship of the relationship types is applicable to relate a plurality of objects having object types that are specified by the assignments. In the example, assignment 252 relates a relationship type RST1 to two object types OT1 and OT2. Objects of object type OT1 may be for example the objects 231-233 (FIG. 2) with the square shape and objects of object type OT2 may be for example the objects 234 and 235 (FIG. 2) with the circle shape. The assignment 252 specifies that a relationship having relationship type RST1 is applicable to relate an object having object type OT1 and a further object having object type OT2. Having for example a plurality of identified object types OT1 and OT2 from selected objects it follows from assignment 252 that relations of relationship type RST1 are applicable to relate the selected objects. Assignments 254-258 specify different object type combinations and assign the combinations to a relationship type RST2. In case that more than one assignment specifies one combination of object types it follows that a combination of objects having object types specified by the one combination can be related by one or more relationships of more than one relationship type.

A table of negative assignments 260 contains example negative assignments 262-268. The negative assignments 262-268 assign a relationship type to a plurality of object types signifying that a relationship of the relationship type is not applicable to relate a plurality of objects having object types that are specified by the negative assignments. In the example, negative assignment 262 relates a relationship type RST2 to two object types OT1 and OT2. The assignment 262 specifies that a relationship having relationship type RST1 is not applicable to relate an object having object type OT1 and a further object having object type OT2. The negative assignment may be used in case that a number of assignments is large because objects of many object types may be related by relationships of many relationship types. In such a case a number of negative assignments may be small. Determining 140 one or more relationship types may include for example determining a set of all relationship types available to the computer program and use the negative assignments to delete a relationship type from the set. Depending on the computer program this may result in a low memory requirement and a fast execution of the method.

Figure 4:
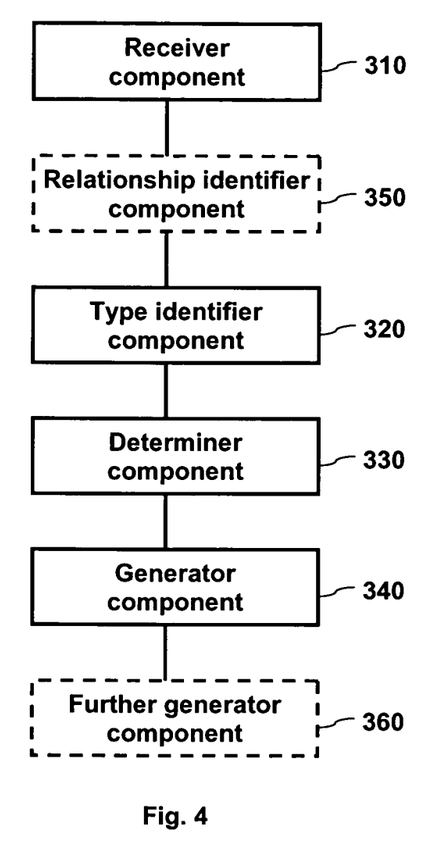
FIG. 4 shows components of a computer system, according to an example embodiment of the invention.

FIG. 4 shows components of a computer system, according to an example embodiment. Certain components of the computer system are indicated by boxes with dashed lines. The computer system provides entries for the context menu with relationships that are applicable to relate the selected objects. In FIG. 4, a box represents a component and a line represents an interface for exchanging data between two components. The computer system includes a receiver component 310 that is configured to receive the identifications of the selected objects. A relationship identifier component 350 may be configured to identify an existing relationship between the selected objects, that is, the objects of which the identifications have been received by the receiver component. The identifications of the selected objects are transferred with an interface between the receiver component 310 and the relationship identifier component 350. The system further includes a type identifier component 320 that is configured to identify the object types of the selected objects. The identifications are again transferred with an interface between the receiver component 310 and the type identifier component 320. The interface between the receiver component 310 and the type identifier component 320 may include the interface between the receiver component 310 and the relationship identifier component 350 and the interface between the relationship identifier component 350 and the type identifier component 320. In a further example, the interface between the receiver component 310 and the type identifier component 320 may directly connect the receiver component 310 and the type identifier component 320. A determiner component 330 of the system is configured to determine a relationship type of a relationship that is applicable to the selected objects. The relationship type is determined by using the object types identified by the type identifier component. The determiner component 330 may be further configured in case more than two objects have been selected to determine a relationship type of multiple relationships. The multiple relationships are applicable to the selected objects and they relate one object of the selected objects having a first object type to residual objects of the selected objects having a second object type by creating multiple times a relationship. The determiner component 330 may further be configured to select the relationship type from the one or more assignments that specify the identified object types. A generator component 340 is configured to generate for the context menu an entry representing a relationship of the one or more relationship types determined by the determiner component 350. Accordingly, the relationship is selectable by the user to be applied to the selected objects. The generator component 340 may be further configured to delete a relationship from the relationships of the one or more relationship types in case that the relationship has an attribute and that the attribute does not fulfil a restriction applicable to the relationship attribute. A further generator component 360 may be configured to generate for the context menu an entry which is selectable by user to maintain the identified relationship.

Figure 5:
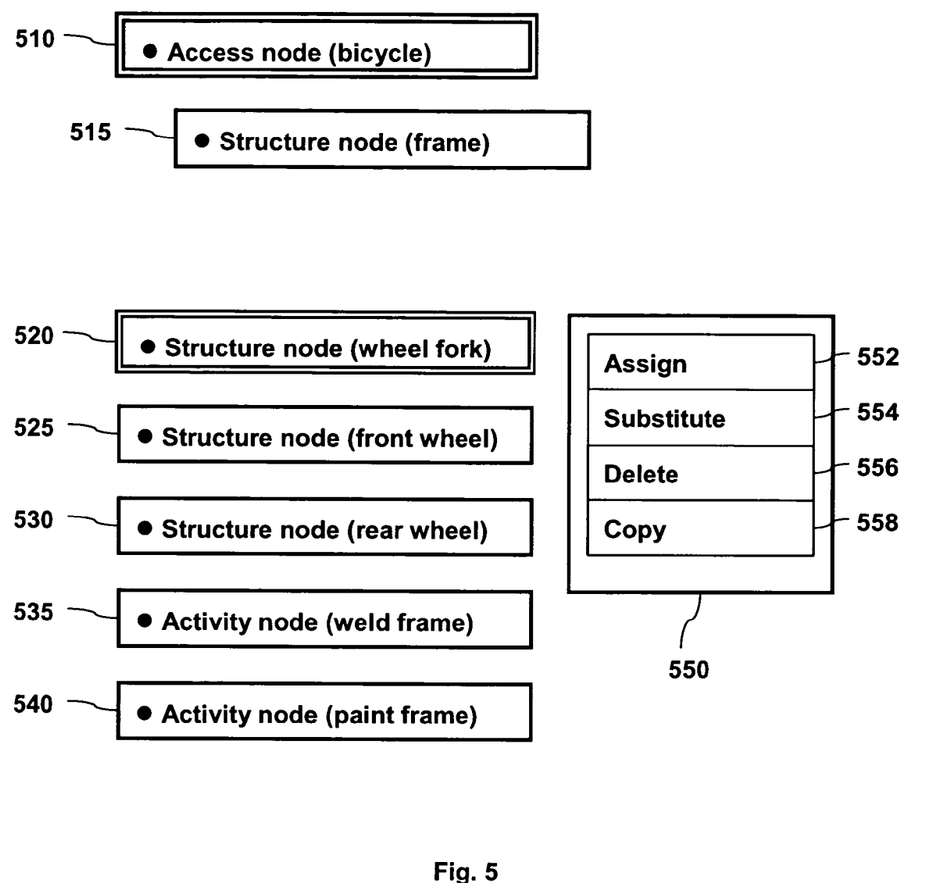
FIG. 5 illustrates an example situation with two selected objects and a context menu an entry for creating a relationship.

FIG. 5 illustrates an example situation with two selected objects and a context menu. The example situation is provided by an example program for creating and maintaining an enhanced bill of material. A bill of material describes a finished product and components of the finished product. The enhanced bill of material may further include a description of manufacturing processes for assembling the finished product. The bill of material may also refer to the enhanced bill of material. The example program models the enhanced bill of material, EBOM, using nodes which represent relevant elements of a production process. A usage of nodes renders a construction of the EBOM fast and flexible because nodes and substructure of nodes can be used for different EBOM. On the other hand, the usage of nodes renders the EBOM more complex because further rules apply to the usage of nodes. The rules may or may not depend on the relevant elements that are assigned to the nodes. Providing a context menu for relationships between the EBOM may be helpful to the user.

Examples for nodes of the EBOM are as follows: an access node to which one or more finished products are assigned, a structure node to which one or more components of a finished product are assigned, and an activity node representing a manufacturing process. Examples for relationships for the nodes of the EBOM are as follows: an assemble relationship which may for example describe that a component is used for an assembly of a further component, an assign relationship which may be used to assign a structure node to an access node, a process relation which may relate for example an activity node to a structure node.

In FIG. 5 there are two areas separated by line. In a first area there is an access node 510 which represents the finished product of a bicycle. A structure node 515 which represents the component of a frame of the bicycle is assigned to the access node 510. The first area is an EBOM construction and maintenance area. The access node 510 and the structure node 515 represent a part of an EBOM. In the second area there are further nodes: a structure node 520 which represents a wheel fork, a structure node 525 which represents a front wheel, a structure node 530 which represents a rear wheel, an activity node 535 which represents a process to weld a frame, and an activity node 540 which represents a process to paint a frame. The second area represents a loading area from which objects for the EBOM are selected. It may be that the two areas are not separated from each other. It may also be that more than one EBOM are in the first area and one or more EBOM are in the second area.

FIG. 5 illustrates an example situation in which the user has selected the access node 510 and the structure node 525. Upon the selection of the two nodes the user has requested a context menu 550. The context has entries generated according to an embodiment of the invention. There are an assign relationship entry 552, a substitute relationship entry 554, a delete relationship entry 556, and a copy relationship entry 558. The assign relationship assigns the structure node 520 to the access node 510, that is, the structure node 520 is added to the EBOM in the first area. The substitute relationship substitutes the access node 510 by the structure node 520. The substitute relationship may have a different relationship type than the assign relationship because a substitute relationship may for example relate all different kinds of nodes and the assign relationship may for example only relate an access node and a structure node. In the context menu 550 there is a delete relationship entry 556 which deletes the selected nodes. There is further a copy relationship entry 558 which copies the selected nodes into a separate buffer from which the selected nodes may be retrieved again. The delete relationship and the copy relationship may have an identical relationship type that is different from any one of the relationship types of the assign and substitute relationship. The reason is that the delete and copy relationships are independent from the selected nodes and the object types of the selected nodes. According to the entries of the context menu the user may select an activity.

Figure 6:
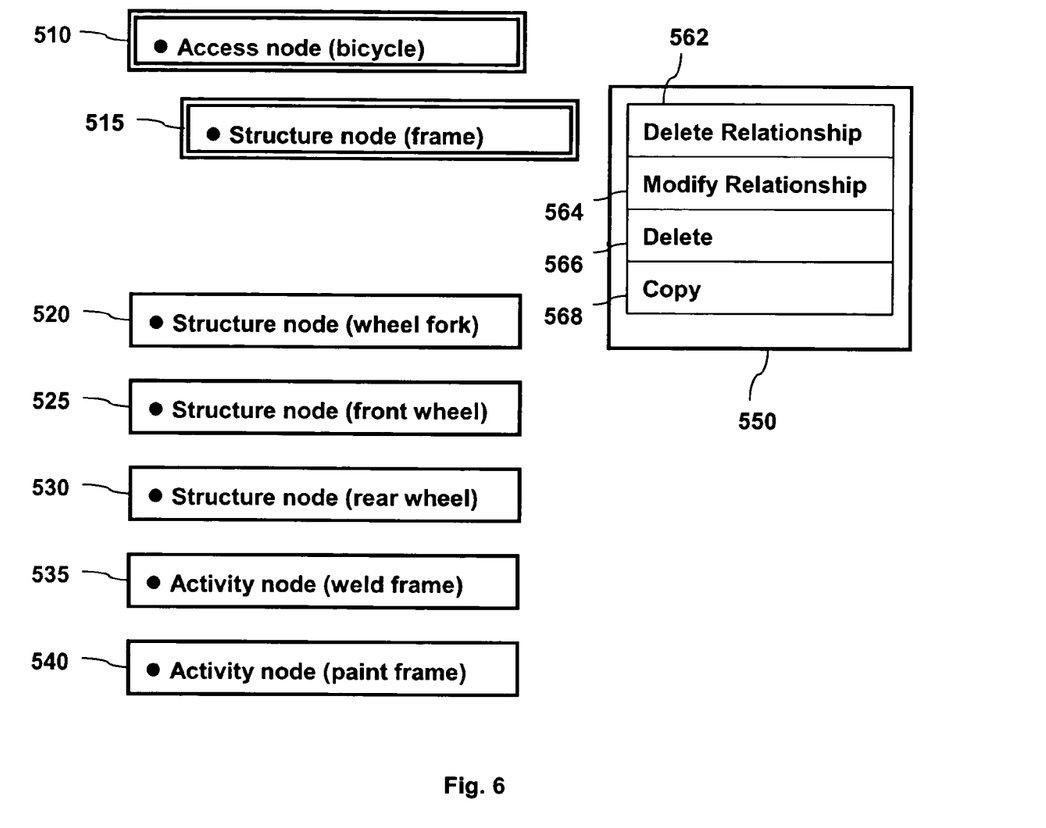
FIG. 6 illustrates an example situation with two selected objects and a context menu with entries for maintaining a relationship.

FIG. 6 illustrates a further example situation with two selected objects and a context menu. The displayed nodes 510-540 and their positions are identical to the previous situation illustrated in FIG. 5. However, the user has selected the access node 510 and the structure node 515 previously to requesting the context menu 550. According to the embodiment of the invention the context menu has delete relationship entry 562, modify relationship entry 564, delete entry 566, and copy entry 568. Because the selected nodes are related by a previously created assign relationship and the embodiment of the invention has identified the relationship two entries for maintaining the identified relationship have been generated: the delete relationship entry 562 and the modify relationship entry 564. Selecting the delete relationship may delete the structure node 515 from the EBOM and add the structure node to the second area. Selecting the modify relationship the program may create a further user interface so that the user can enter new data with respect to the identified relationship. Examples for such data are one of the following: an attribute of the identified relationship, a multiplication value determining how many frames are related to the bicycle. The delete 566 and the copy 568 relationship entries represent the same activities as in FIG. 5.

Figure 7:
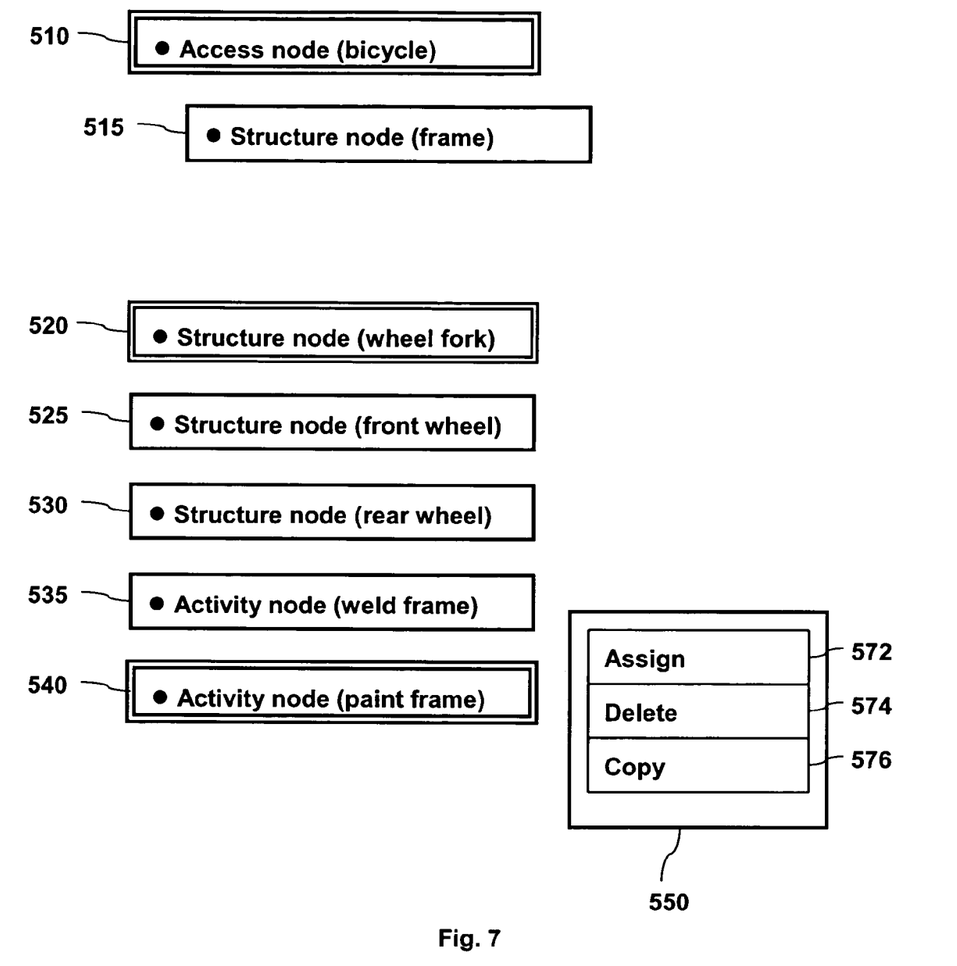
FIG. 7 illustrates an example situation with three selected objects and a context menu with relationships applicable to the selected objects.

FIG. 7 illustrates an example situation with three selected objects and a context menu. The displayed nodes 510-540 and their positions are identical to the previous situations illustrated in FIG. 5 and FIG. 6. However, the user has selected the access node 510, the structure node 520, and the activity node 540 previously to requesting the context menu 550. According to the embodiment of the invention the context menu has assign entry 572, delete entry 574, and copy entry 576. The assign relationship represented by entry 572 is an example of a relationship that relates three selected objects. Selecting the assign entry 572 the program may assign the structure node 520 to the access node 510 and assign the activity node 540 to the structure node 520. Therefore, after the assign the EBOM may include two further nodes: the structure node 520 and the activity node 540. After the assign, the structure nodes 515 and 520 may be assigned as components to the access node 510 and the activity node 540 may be assigned to the structure node 520. The delete 574 and the copy 576 relationship entries represent the same activities as in FIG. 5 and FIG. 6.

Figure 8:
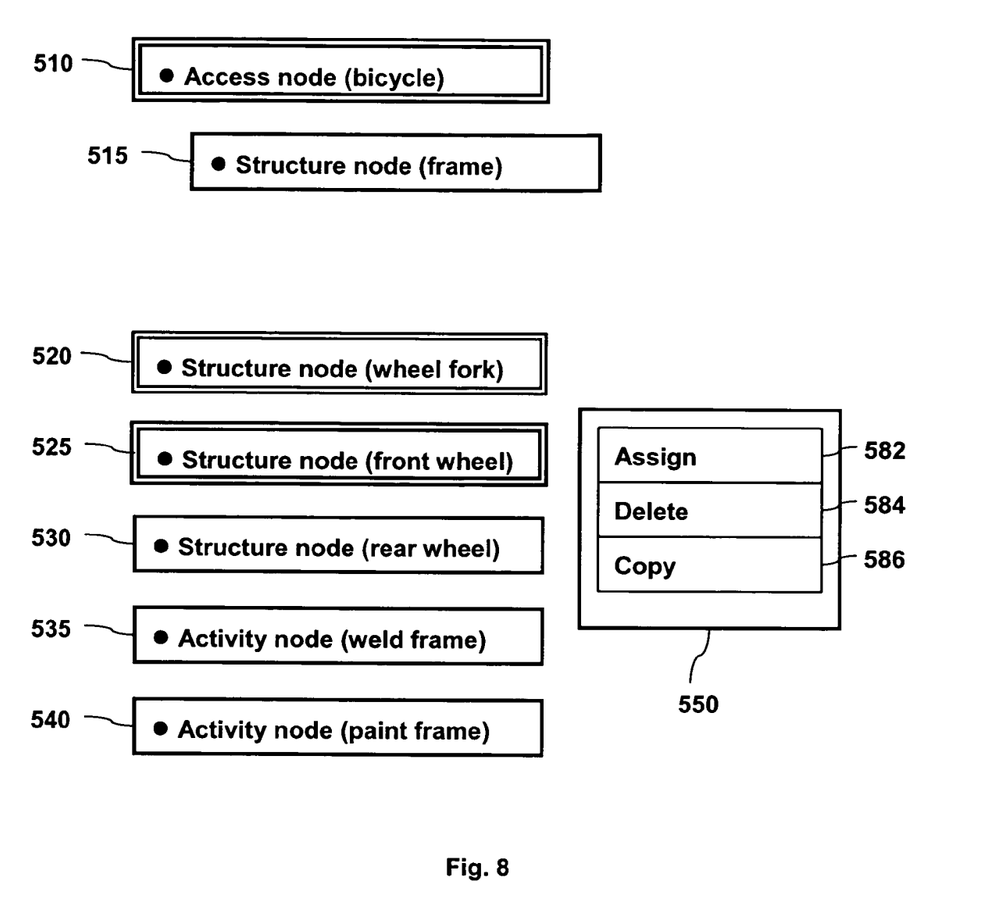
FIG. 8 illustrates an example situation with three selected objects and a context menu with multiple relationships applicable to the selected objects.

FIG. 8 illustrates a further example situation with three selected objects and a context menu. The displayed nodes 510-540 and their positions are identical to the previous situations illustrated in FIG. 5-7. However, the user has selected the access node 510, the structure node 520, and the activity node 540 previously to requesting the context menu 550. According to the embodiment of the invention the context menu has assign entry 582, delete entry 584, and copy entry 586. The assign entry 582 represents a multiple relationship that relates the three selected nodes with two separate assign relationships. Selecting the multiple assign relationship entry 572 the program may create two relationships: a first assign relationship between the access node 510 and the structure node 520 and a second assign relationship between the access node 510 and the structure node 525. The identical result can be achieved in two operations by selecting the access node 510 and the structure node 520 and creating the assign relationship between the two nodes and further selecting the access node 510 and the structure node 525 and creating the assign relationship between the two nodes. However, the two operations way is less efficient with respect to computer resources such as computation time.

Figure 9:
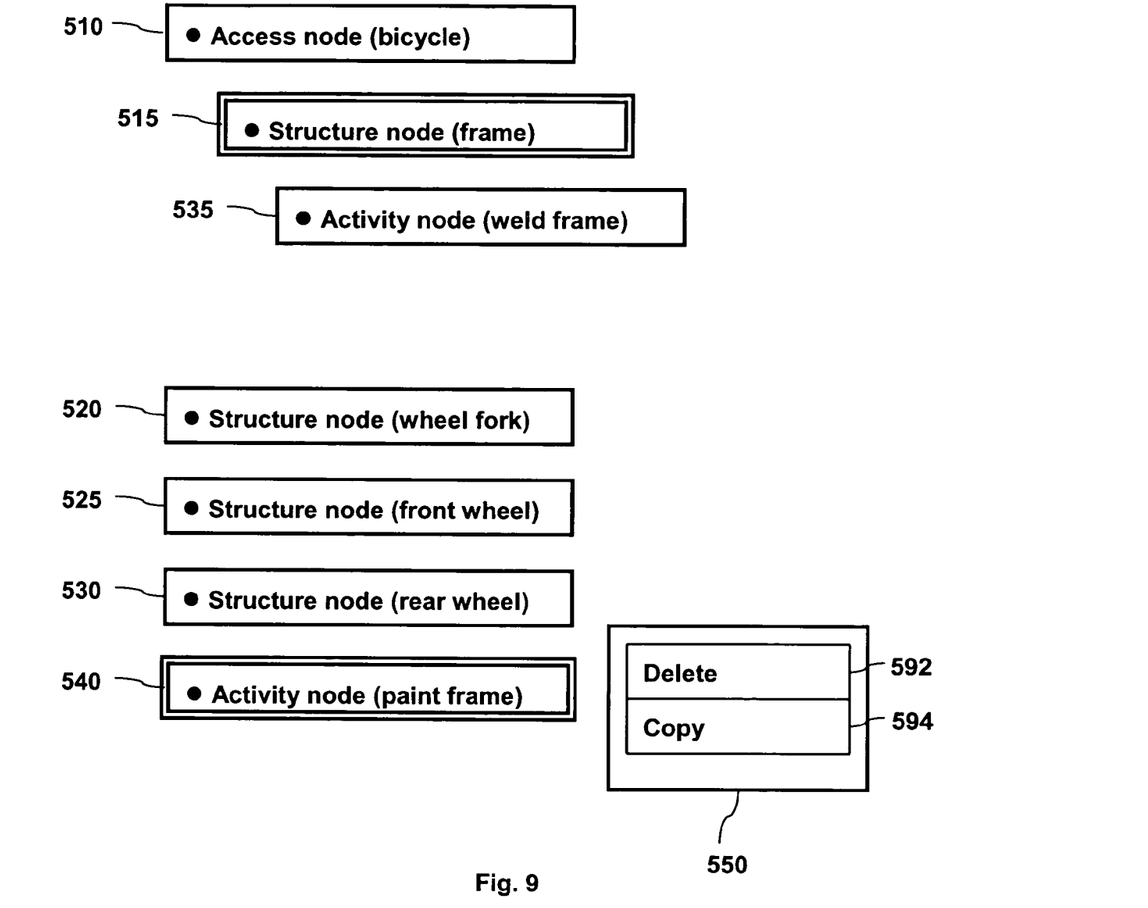
FIG. 9 illustrates an example situation with two selected objects and a context menu with a reduced number of entries.

FIG. 9 illustrates an example situation with two selected objects and a context menu with a reduced number of entries. The displayed nodes 510-540 are identical to the previous situations illustrated in FIG. 5-8. The user has selected the structure node 515 and the activity node 540 previously to requesting the context menu 550. According to the embodiment of the invention the context menu has delete entry 592 and copy entry 594. There is no entry for representing an assign relationship. A reason for this may be for example that only one activity node may be assigned to a structure node, that is, a cardinality attribute of an assign relationship between a structure node and an activity is zero to one. Therefore, no further activity node may be assigned to the structure node 515 because the activity node 535 is already assigned to the structure node 515. A further assign relationship of the activity node 540 does not fulfil a restriction applicable to the cardinality attribute. Accordingly the further assign relationship is deleted from the applicable relationships for which the context menu entries are generated. A further reason may be for example that the user has an authorization to add structure nodes which represent a product aspect to the EBOM but not to add activity nodes which represent a production process aspect to the EBOM. According to an authority restriction which applies to the authority attribute of the assign relationship between the structure node 515 and the activity node 540 the assign relationship is deleted from the applicable relationships.

The embodiments can be implemented in digital electronic circuitry, or in computer hardware, firmware, software, or in combinations of them. The invention can be implemented as a computer program product, for example, in a machine-readable storage device, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the embodiment of the invention can be performed by one or more programmable processors executing a computer program to perform functions of the invention by operating on input data and generating output. Method operations can also be performed by, and apparatus of the invention can be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry.

What is claimed is:

1. A method for providing to a user a context menu with entries representing relationships, wherein the entries are selectable by the user to relate a plurality of objects selected from a set of objects, the method comprising:
   receiving a first identification of a first selected object from the set of objects;
   receiving a second identification of a second selected object from the set of objects;
   identifying object types of the selected objects in a plurality of object types;
   determining one or more relationship types requiring at least one object of the object type of the first selected object and at least one object of the object type of the second selected object as input in order to be created as a relationship between objects; and
   generating for the context menu an entry for creating a relationship of the one or more relationship types, wherein the entry is selectable by the user to create the relationship between the selected objects, and wherein the relationship changes an attribute of each object.

2. The method of claim 1 further comprising:
   identifying a relationship that has been created previously between the selected objects;
   generating for the context menu an entry which is selectable by the user to maintain the identified relationship.

3. The method of claim 2 wherein maintaining the identified relationship means deleting the identified relationship.

4. The method of claim 2 wherein maintaining the identified relationship means modifying an attribute of the identified relationship.

5. The method of claim 1 further comprising: upon having received the second identification of the second object, receiving one or more further identifications of selected objects from the set of objects.

6. The method of claim 5 further comprising:
checking if one object of the selected objects is of a first object type and if residual objects of the selected objects are of a second object type;
generating for the context menu an entry for creating multiple relationships of the one or more relationship types, wherein the entry is selectable by the user to create multiple times a relationship between the one object of the first object type and the residual objects of the second object type.

7. The method of claim 1 wherein determining the one or more relationship types comprises: selecting the one or more relationship types from one or more assignments that specify the identified object types, wherein an assignment which assigns a relationship type to a plurality of object types signifies that a relationship of the relationship type is applicable to relate a plurality of objects having object types that are specified by the assignment.

8. The method of claim 1 wherein determining the one or more relationship types comprises:
selecting the one or more relationship types from a set of relationship types; and
deleting a selected relationship type that is specified by a negative assignment, wherein the negative assignment which assigns a relationship type to a plurality of object types signifies that a relationship of the relationship type is not applicable to relate a plurality of objects having object types that are specified by the negative assignment.

9. The method of claim 1 wherein generating the entry for the context menu further comprises deleting a relationship of the one or more relationship types in case that the relationship has an attribute and that the attribute does not fulfill a restriction applicable to the attribute.

10. The method of claim 1 wherein the objects comprise nodes representing items of a bill of material and the relationships comprise relationships between the nodes.

11. The method of claim 10 wherein a node is any one of the following nodes:
an access node to which one or more finished products are assigned, a structure node to which one or more components of a finished product are assigned, an activity node representing a manufacturing process.

12. The method of claim 10 wherein a relationship is any one of the following relationships: assemble, assign, process, and substitute.

13. The method of claim 10 wherein an attribute of a relationship is one of the following attributes:
cardinality specifying a number or a range of numbers for relationships to a node, authority requirement for creation of a relationship.

14. A system for providing to a user a context menu with entries representing relationships, wherein the entries are selectable by the user to relate a plurality of objects selected from a set of objects; the system comprising:
a computer including a processor, a memory device, and components for providing to the user the context menu, the components including:
a receiver component to receive identifications of selected objects from the set of objects;
a type identifier component to identify object types of the selected objects of which identifications have been received by the receiver component;
a determiner component to determine one or more relationship types using the object types identified by the type identifier component and the one or more relationship types requiring at least one object of the object type of the first selected object and at least one object of the object type of the second selected object as input in order to be created as a relationship between objects; and
a generator component to generate for the context menu an entry for creating a relationship of the one or more relationship types, wherein the entry is selectable by the user to create the relationship between the selected objects, and wherein the relationship changes an attribute associated with each of the selected objects.

15. The system of claim 14 further comprising:
a relationship identifier component to identify an existing relationship between the selected objects;
a further generator component to generate for the context menu an entry which is selectable by user to maintain the identified relationship.

16. The system of claim 14 wherein the determiner component, in case that more than two objects have been selected, is to determine a relationship type of multiple relationships that are applicable to the selected objects, wherein the multiple relationships relate one object of the selected objects having a first object type to residual objects of the selected objects having a second object type by creating multiple times a relationship.

17. The system of claim 14 wherein the determiner component is to select the one or more relationship types from one or more assignments that specify the identified object types, wherein an assignment which assigns a relationship type to a plurality of object types signifies that a relationship of the relationship type is applicable to relate a plurality of objects having object types that are specified by the assignment.

18. The system of claim 14 wherein the generator component is further to delete a relationship from the relationships of the one or more relationship types in case that the relationship has an attribute and that the attribute does not fulfill a restriction applicable to a relationship attribute.

19. A non-transitory computer program product with computer instructions that cause a computer system to perform to the method of claim 1 when the computer system executes the computer instructions.

* * * * *